(12) United States Patent
Wang et al.

(10) Patent No.: US 12,297,917 B2
(45) Date of Patent: May 13, 2025

(54) CONTROL VALVE

(71) Applicant: ZHEJIANG SANHUA AUTOMOTIVE COMPONENTS CO., LTD., Zhejiang (CN)

(72) Inventors: Lixin Wang, Zhejiang (CN); Long Lin, Zhejiang (CN); Yun Wang, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 43 days.

(21) Appl. No.: 18/555,532

(22) PCT Filed: Apr. 15, 2022

(86) PCT No.: PCT/CN2022/087035
§ 371 (c)(1),
(2) Date: Oct. 15, 2023

(87) PCT Pub. No.: WO2022/218407
PCT Pub. Date: Oct. 20, 2022

(65) Prior Publication Data
US 2024/0191805 A1    Jun. 13, 2024

(30) Foreign Application Priority Data
Apr. 16, 2021  (CN) ................... 202110411378.0

(51) Int. Cl.
*F16K 11/08*    (2006.01)
*F16K 11/085*   (2006.01)
*F16K 27/06*    (2006.01)

(52) U.S. Cl.
CPC ........ *F16K 11/0856* (2013.01); *F16K 27/065* (2013.01)

(58) Field of Classification Search
CPC .................................................. F16K 27/065
See application file for complete search history.

(56) References Cited

U.S. PATENT DOCUMENTS 11,156,296 B2 * 10/2021 Liu ........................... F16K 1/36
2006/0118066 A1    6/2006 Martins
(Continued)

FOREIGN PATENT DOCUMENTS

| CN | 103791114 A | 5/2014 |
| CN | 107830207 A | 3/2018 |

(Continued)

OTHER PUBLICATIONS

The Japanese 1st Office Action issued on Aug. 27, 2024 for JP2023-563125.
(Continued)

*Primary Examiner* — Kevin R Barss
(74) *Attorney, Agent, or Firm* — Yue (Robert) Xu; Apex Attorneys at Law, LLP

(57) ABSTRACT

A control valve is provided, which comprises a valve body, a valve core, a sealing component and a balance sealing block. The control valve comprises at least five channels. A side wall part is provided with at least five communication ports. The communication ports are in communication with a valve cavity. A sealing body part of the sealing component is positioned between the valve core and the side wall part. The sealing body part is provided with through holes penetrating through the sealing component. In the region of the side wall part that in contact with the sealing body part, the number of communication ports is the same as the number of through holes, and the communication ports and the through holes are in communication correspondingly.

19 Claims, 12 Drawing Sheets

(56) References Cited

U.S. PATENT DOCUMENTS

2015/0316156 A1 11/2015 Nagahama
2018/0313457 A1 11/2018 Shen et al.
2018/0372235 A1 12/2018 Smith

FOREIGN PATENT DOCUMENTS

| | | | |
|---|---|---|---|
| CN | 108798863 | A | 11/2018 |
| CN | 209278546 | U | 8/2019 |
| CN | 110440032 | A | 11/2019 |
| CN | 112032326 | A | 12/2020 |
| CN | 215487806 | U | 1/2022 |
| CN | 215928493 | U | 3/2022 |
| JP | 2006512540 | A | 4/2006 |
| JP | 2012021595 | A | 2/2012 |
| JP | 2015209958 | A | 11/2015 |
| JP | 2017044266 | A | 3/2017 |
| JP | 2018184937 | A | 11/2018 |

OTHER PUBLICATIONS

International Search Report for PCT/CN2022/087035 mailed Jul. 15, 2022, ISA/CN.

\* cited by examiner

CONTROL VALVE

CROSS REFERENCE

This disclosure is a national phase application of PCT international patent application PCT/CN2022/087035 filed on Apr. 15, 2022 which claims priority to Chinese Patent Disclosure No. 202110411378.0, titled "CONTROL VALVE", filed on Apr. 16, 2021 with the China National Intellectual Property Administration, which are incorporated herein by reference in its entirety.

FIELD

The present disclosure relates to the technical field of fluid control, and in particular to a control valve.

BACKGROUND

Some systems are required to use a multi-way control valve to control flow paths. In order to realize fluid control of multiple flow paths of the control valve, it is required to provide multiple flow passages in the control valve, and sealing members are required to seal the multiple flow passages. How to arrange the multiple flow passages and the sealing member to improve the stability of the control of the multiple flow paths and improve the sealing performance of the control valve is an urgent problem to be solved.

SUMMARY

The purpose of the present disclosure is to provide a control valve that can improve the stability of fluid control of multiple flow paths and improve the sealing performance of the control valve.

A control valve is provided according to the embodiments of the present disclosure. The control valve includes a valve body, a valve core, and a sealing member. The valve body includes a side wall part, the control valve has a valve cavity, the side wall part is a peripheral wall of the valve cavity or at least part of the peripheral wall, and at least part of the valve core and the sealing member are arranged in the valve cavity, the sealing member includes a sealing body, wherein the sealing body is arranged between the valve core and the side wall part along a radial direction of the valve core, an inner surface of the sealing body is in contact with the valve core, and an outer surface of the sealing body is in contact with the side wall part; and the control valve further includes a balance sealing block, wherein the balance sealing block is arranged between the side wall part and the valve core along the radial direction of the valve core and is in contact with the valve core, the balance sealing block and the sealing member are arranged along a circumferential direction of the valve core, and a direction of a force or a component force applied to the valve core by the balance sealing block on is opposite to a direction of a force or a component force applied to the valve core by the sealing member.

The control valve provided according to the embodiment of the present disclosure includes the sealing member and the balance sealing block. A cross section of the sealing member is in an arc-shaped structure. Compared with an annular structure of a cross section of the sealing member, the sealing member according to the embodiments of the present disclosure has a relatively large expansion space and a relatively low manufacturing precision. The balance sealing block is arranged between the side wall part and the valve core, and the balance sealing block and the sealing member are arranged along the circumferential direction of the valve core. When the valve core presses the sealing member and the balance sealing block, the direction of the force or the component force applied to the valve core by the balance sealing block is opposite to the direction of the force or the component force applied to the valve core by the sealing member, so that the valve core can be conveniently kept coaxial with the side wall part, the rotation stability of the valve element is improved, fluid leakage caused by sealing deviation caused by eccentricity of the valve element is prevented, the sealing performance of the control valve is improved, and the stability of the control valve on fluid control is improved.

DETAILED DESCRIPTION OF EMBODIMENTS

Features and exemplary embodiments of various aspects of the present disclosure are described in detail below. In order to make the purposes, technical solutions and advantages of the present disclosure clearer, the present disclosure is further described in detail below in conjunction with the drawings and specific embodiments. In this specification, relational terms such as "first" and "second" are only used to distinguish one element from another element with a same name, and do not necessarily require or imply any actual relationship or order between the elements.

Figure 1:
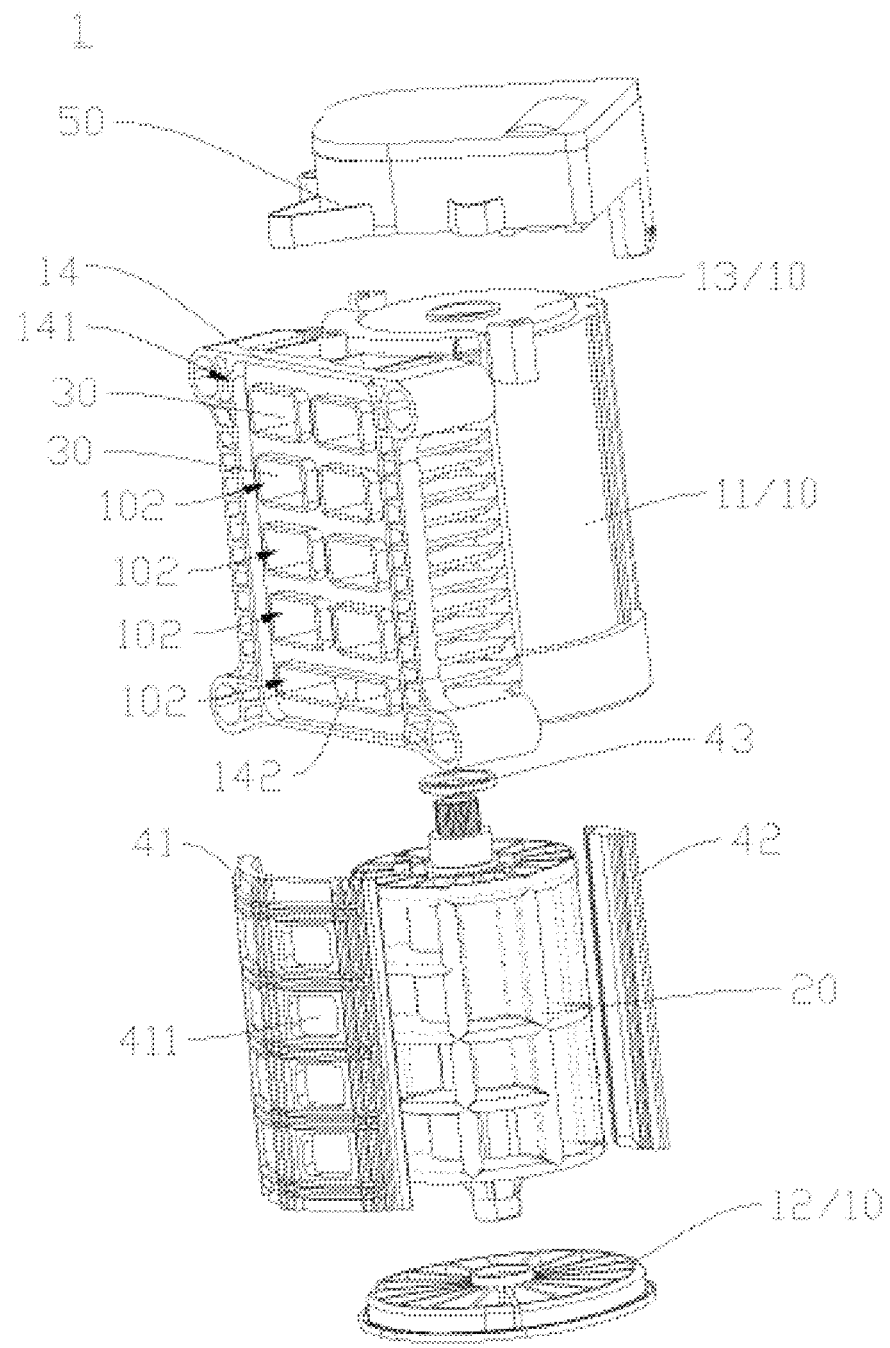
FIG. 1 is an exploded structural schematic view of a control valve provided according to an embodiment of the present disclosure.
Figure 2:
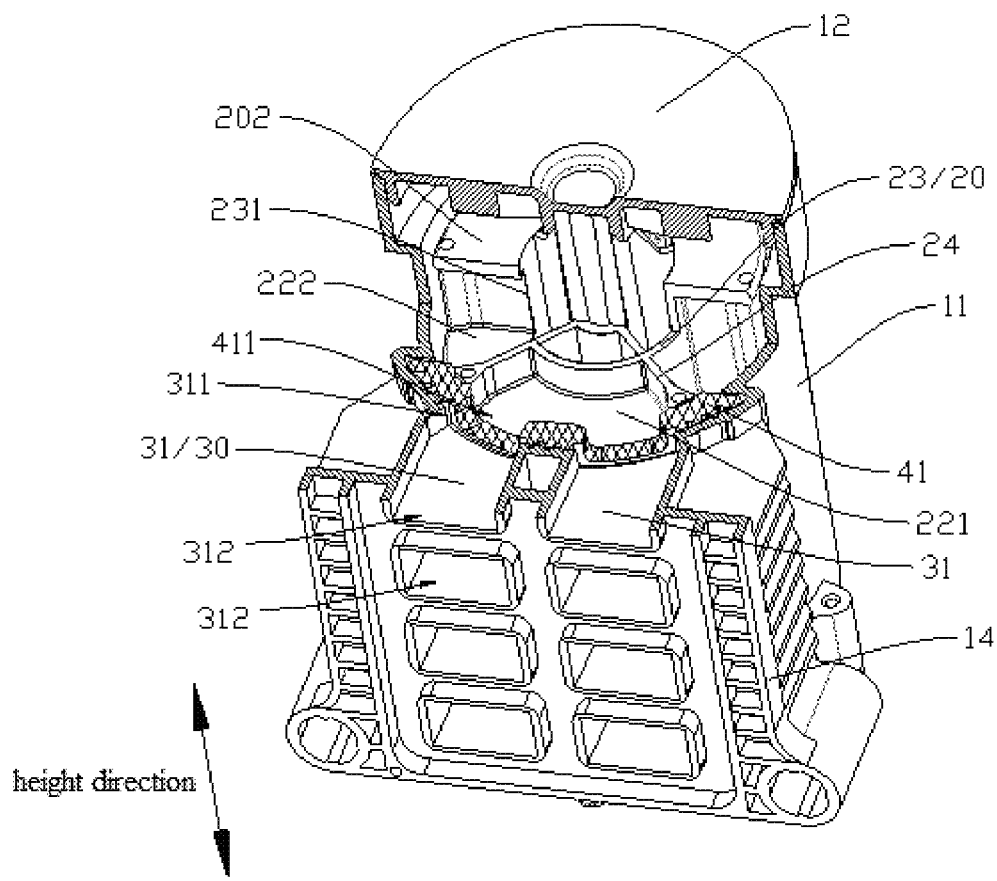
FIG. 2 is a schematic partial cross-section structural view of the control valve shown in FIG. 1 at a certain position.
Figure 3:
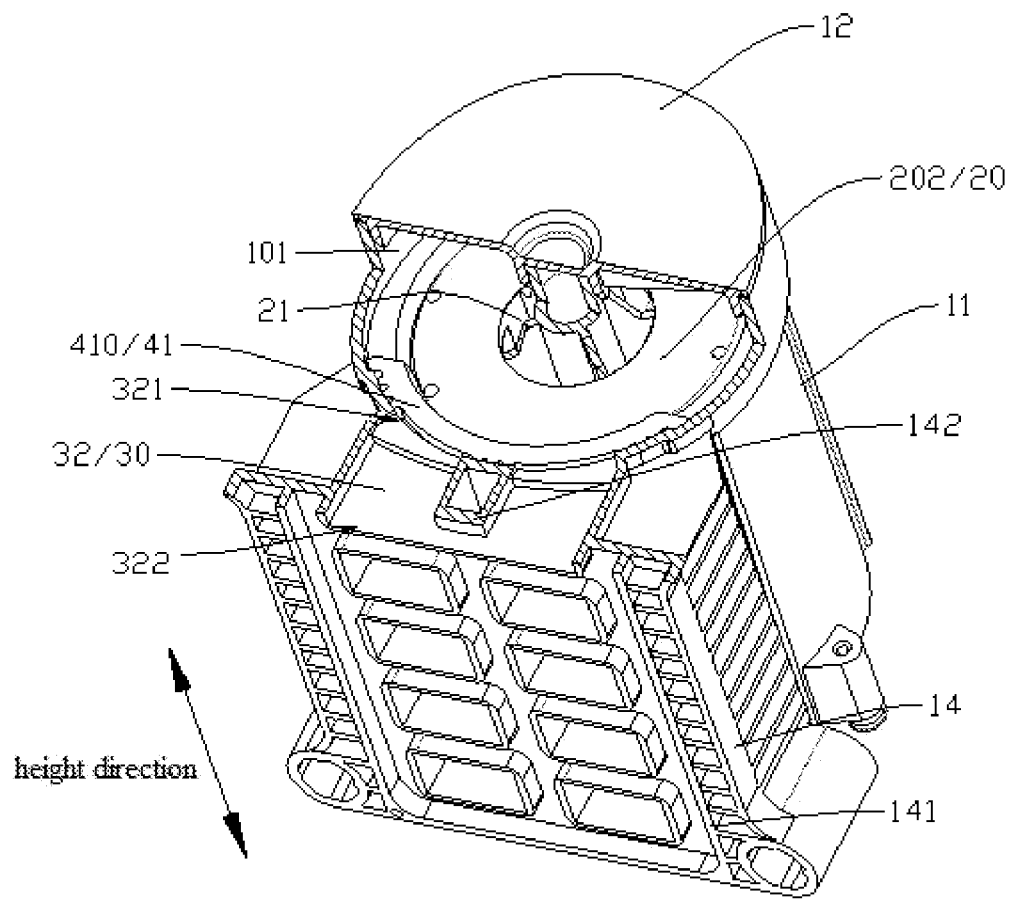
FIG. 3 is a schematic partial cross-section structural view of the control valve shown in FIG. 1 at another position.

As shown in FIGS. 1 to 3, a control valve 1 is provided according to an embodiment of the present disclosure. The control valve 1 includes a valve body 10, a valve core 20, and a sealing member 41. The valve body 10 includes a side wall part 11, and the control valve 1 has a valve cavity 101. The side wall part 11 is a peripheral wall of the valve cavity 101 or at least part of the peripheral wall. At least part of the valve core 20 is arranged in the valve cavity 101, and the valve core 20 can be driven to rotate. The control valve 1 can further include a driving device 50 and a sealing ring 43, the driving device 50 includes a driving element, and the driving element may be an electric motor or a motor and a reduction gear set. The valve core 20 can be driven to rotate by the driving element in the driving device 50, and at least part of the sealing member 41 is arranged between the valve core 20 and the side wall part 11. In FIG. 1, the valve body 10 further includes a bottom wall part 12 and a top wall part 13, the bottom wall part 12, the top wall part 13, and the side wall part 11 enclose to form the valve cavity 101, and the sealing ring 43 is arranged between the top wall part 13 and the valve core 20. At least part of the side wall part 11 is located between the bottom wall part 12 and the top wall part 13. One of the bottom wall part 12 and the top wall part 13 is integrally formed with the side wall part 11, and the other of the bottom wall part 12 and the top wall part 13 is sealingly arranged with the side wall part 11. For example, in FIG. 1, the top wall part 13 is integrally formed with the side wall part 11, and the bottom wall part 12 may be fixedly connected to the side wall part 11 and is sealingly arranged with the side wall part 11 by welding, so as to prevent fluid leakage. The sealing ring 43 is arranged between the top wall part 13 and the valve core 20. During the assembly process, the valve core 20 is assembled along the direction from the bottom of the valve body 10 toward the top of the valve body 10, which can reduce the deformation of the scaling ring 43 and improve the sealing performance of the sealing ring 43. The control valve 1 includes at least five passages 30, the side wall part 11 has at least five communication ports, and the at least five communication ports are in communication with the valve cavity 101. One end of each passage 30 penetrates through the side wall part 11 to form the communication port, and the other end of each passage 30 forms a valve port 102 of the control valve 1. Fluid can enter or exit the control valve 1 through the valve end port 102. The number of the passages 30 provided in the control valve 1 may be set according to requirements of a user, for example, the number may also be three, four, five, or six.

In order to facilitate the assembly of the control valve 1 with other components in a fluid control system and improve the integration degree of the control valve 1 with other components, in some embodiments, as shown in FIGS. 1 to 3, the valve body 10 further includes a mounting part 14, the mounting part 14 is fixedly connected to the side wall part 11 and located on a side of the side wall part 11 away from the valve cavity 101. For example, the mounting part 14 and the side wall part 11 may be integrally formed, the mounting part 14 has an mounting surface 141, and the valve port 102 of the control valve 1 penetrates through the mounting surface 141, so that all the valve ports 102 of the control valve 1 are provided in the mounting surface 141 and the orientations of all the valve ports 102 are same, which can relatively simplify assembly of the control valve 1 with other components, reduce leakage points of connecting portions, and improve the reliability of sealing.

In some embodiments, a cross section of the sealing member 41 along a direction perpendicular to a height direction of the sealing member 41 is in an arc-shaped structure. The sealing member 41 includes a sealing body 410, the sealing body 410 is arranged between the valve core 20 and the side wall part 11, an inner surface of the sealing body 410 is in contact with the valve core 20, and an outer surface of the scaling body 410 is in contact with the side wall part 11. The communication ports of the side wall part 11 in the area where the side wall part 11 is in contact with the sealing body 410 are defined as the first communication ports 311. In that case, the communication ports in the side wall part 11 includes the first communication ports 311, the valve ports 102 in communication with the first communication ports 311 are arranged in an array along the height direction of the side wall part 11 and the direction perpendicular to the height direction of the side wall part 11. As shown in FIG. 2, a profile of the mounting surface 141 of the mounting part 14 is substantially in a rectangular structure, a length direction of the mounting surface 141 is parallel to the height direction of the side wall part 11, and the valve ports 102 in communication with the first communication ports 311 are arranged in an array along a length direction and a width direction of the mounting surface 141.

Figure 4:
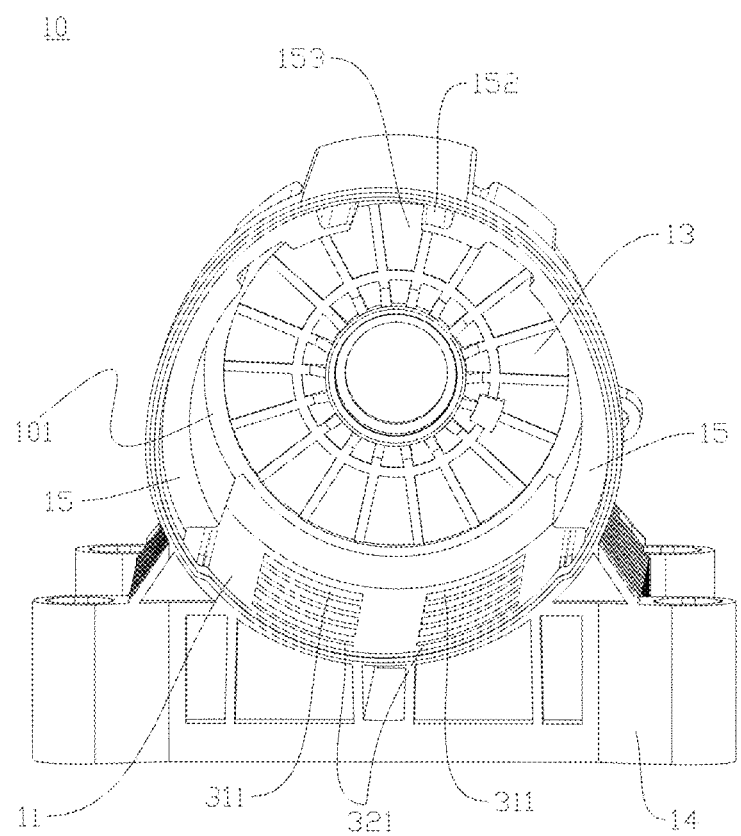
FIG. 4 is a structural schematic view of a valve body provided according to an embodiment of the present disclosure.
Figure 5:
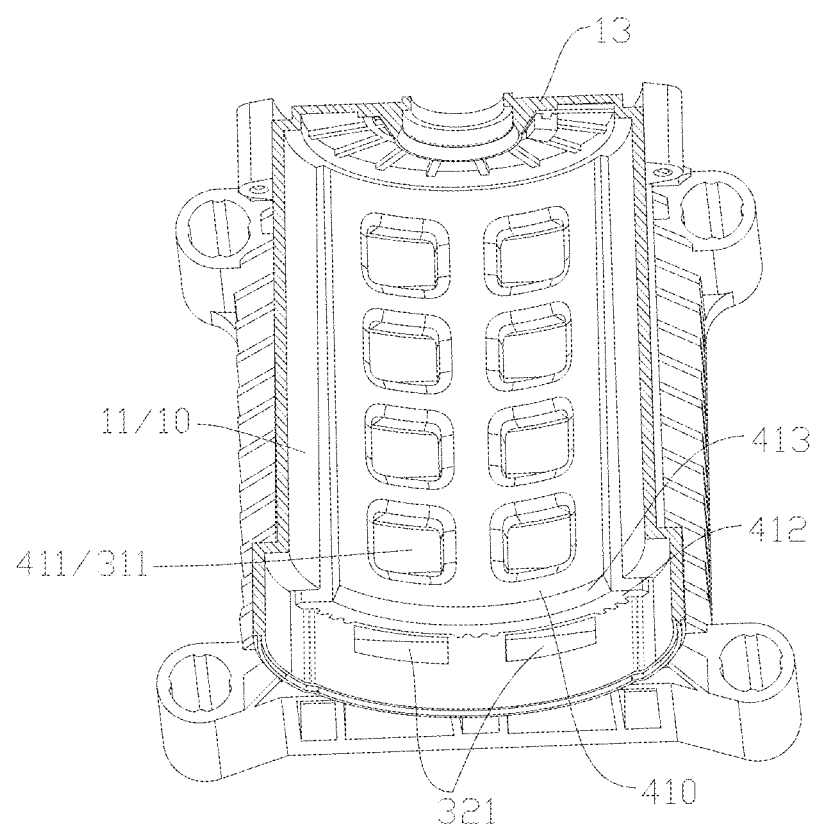
FIG. 5 is a schematic partial cross-section structural view of a combination structure of a valve body and a sealing member provided according to an embodiment of the present disclosure at a position.
Figure 7:
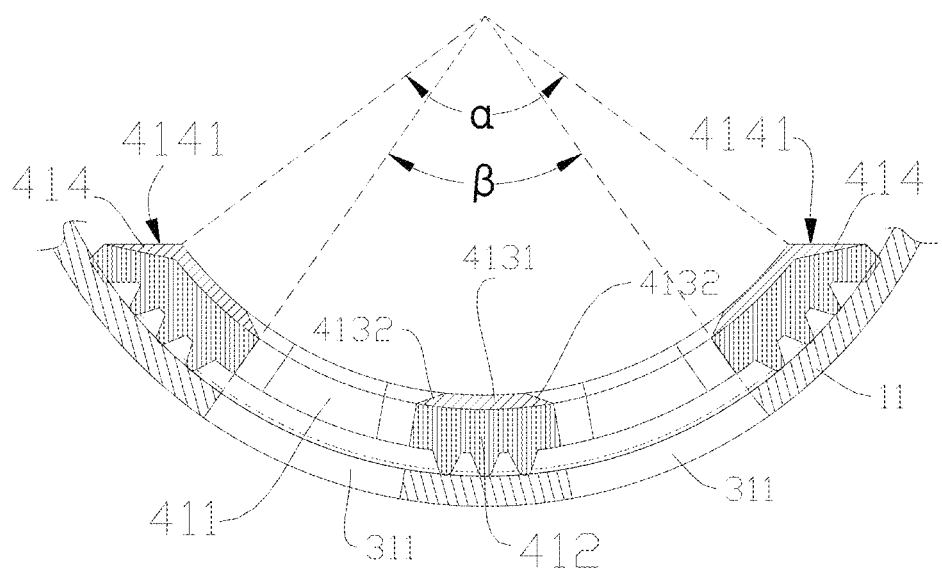
FIG. 7 is a schematic partial cross-section structural view of a cooperation of the sealing member shown in FIG. 6 and the valve body.
Figure 8:
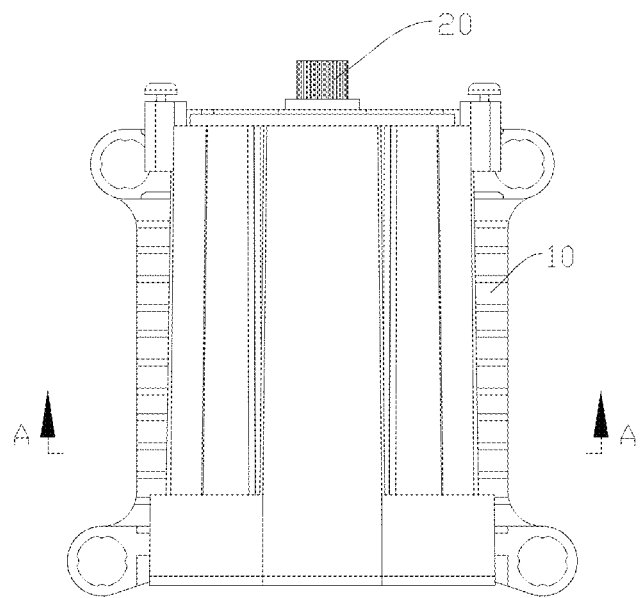
FIG. 8 is a front structural view of a partial structure of the control valve shown in FIG. 1.

As shown in FIGS. 2 to 4, the first communication ports 311 are arranged along the height direction of the side wall part 11 and a circumferential direction of the side wall part 11, and two columns of the first communication ports 311 are arranged along the circumferential direction of the side wall part 11. As shown in FIGS. 2 and 4, in this embodiment, the side wall part 11 has eight first communication ports 311, the side wall part 11 has four rows of the first communication ports 311 along the height direction of the side wall part 11, each row of the first communication ports 311 has two first communication ports 311, and correspondingly, the control valve 1 has eight first valve ports 312 in one-to-one correspondence and in communication with the first communication ports 311. As shown in FIGS. 3, 5, and 7, in case that the sealing member 41 includes the sealing body 410, the sealing body 410 has through holes 411 penetrating through the sealing member 41. The number of the through holes 411 is the same with the number of the first communication ports 311 and the through holes 411 is in communication with the first communication ports 311 correspondingly. The through holes 411 are arranged along the height direction of the sealing member 41 and a circumferential direction of the sealing body 410, and the sealing body 410 is provided with two through holes 411 along the circumferential direction of the sealing body 410. In this embodiment, the scaling body 410 has eight through holes 411, the sealing body 410 has four rows of the through holes 411 along the height direction of the sealing body 410, and each row of the through holes 411 has two through holes 411. The inner surface of the sealing body 410 is an arc surface, and the arc surface contacts the valve core 20. A central angle corresponding to the arc surface of the sealing body 410 is defined as α, and α is greater than a central angle formed by corresponding edges of the two communication ports of the side wall part 11 arranged along the circumferential direction of the side wall part 11. In an embodiment, α is greater than or equal to 100 degrees and less than or equal to 180 degrees. In another embodiment, α is greater than or equal to 100 degrees and less than or equal to 110 degrees. With the above configuration, the manufacturing difficulty of a manufacturing mold of the sealing member can be reduced, thereby reducing the manufacturing difficulty of the sealing member 41 and reducing the manufacturing cost of the sealing member 41.

As shown in FIG. 7, in some embodiments, on a cross section perpendicular to the height direction of the side wall part 11, a maximum central angle formed by edges of the two first communication ports 311 arranged along the circumferential direction of the side wall part 11 with a circle center of the side wall part 11 is defined as β, and β is equal to 90 degrees. Correspondingly, on a cross section perpendicular to the height direction of the sealing member 41, a maximum central angle formed by edges of the two through holes 411 of the sealing member 41 with a circle center of the arc surface of the sealing member 41 is 90 degrees. During the operation of the control valve 1, due to the influence of the control accuracy of the driving element or the signal transmission delay or the rotation inertia of the valve core 20, the valve core 20 has a rotation tolerance, an angle of the rotation tolerance is defined as θ, and α≥β+2θ. In an embodiment, the angle of the rotation tolerance of the valve core 20 may be ±5 degrees, that is, when the driving element stops driving the valve core 20 to rotate, due to the influence of the control accuracy of the driving element or the signal transmission delay or the rotation inertia of the valve core 20, the valve core 20 may stop rotating at a position of 5 degrees before a set angle or continue to rotate by 5 degrees after the set angle, so that the valve core 20 has a rotation tolerance. In order to make the sealing member 41 contact with the valve core 20 during the rotation of the valve core 20 so as to achieve a better sealing performance, and make the sealing member 41 have a larger expansion space and lower manufacturing difficulty, in some embodiments, the central angle α corresponding to the arc surface of the sealing body 410 is 100 degrees.

Figure 9:
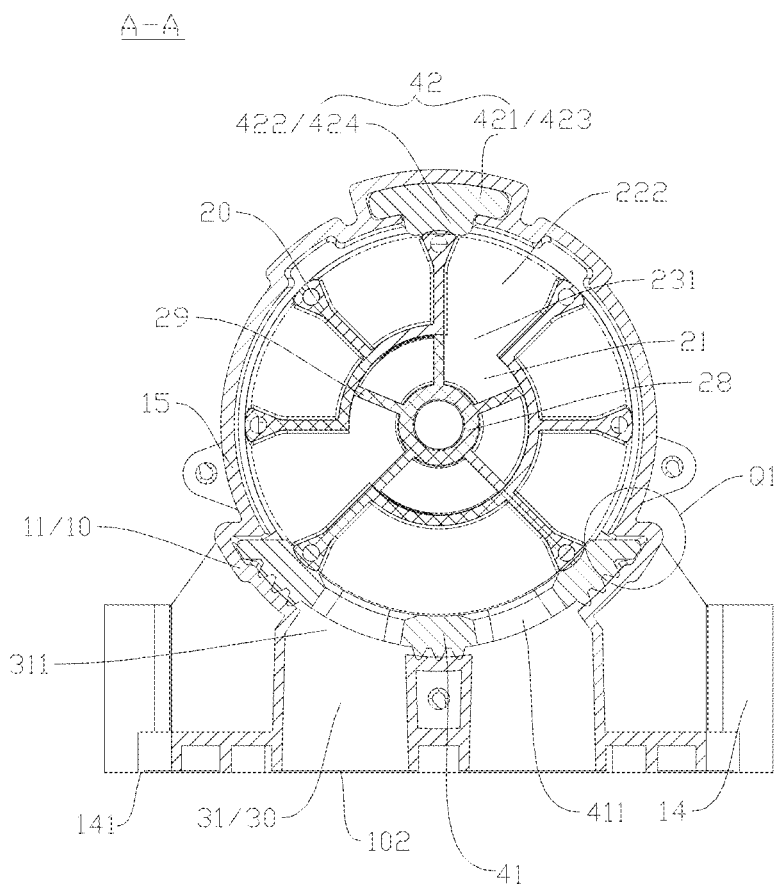
FIG. 9 is a schematic cross-section structural view along A-A direction in FIG. 8.
Figure 10:
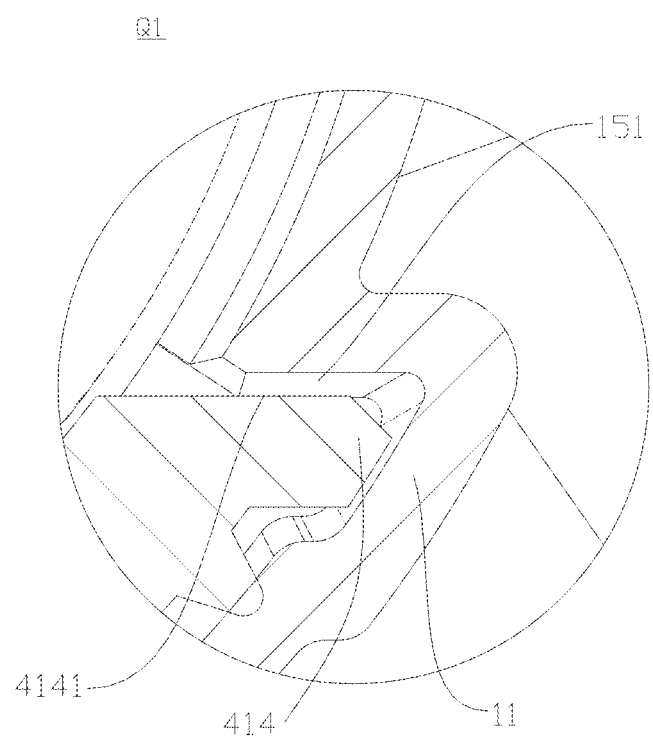
FIG. 10 is a schematic view of an enlarged structure at position Q1 in FIG. 9.
Figure 11:
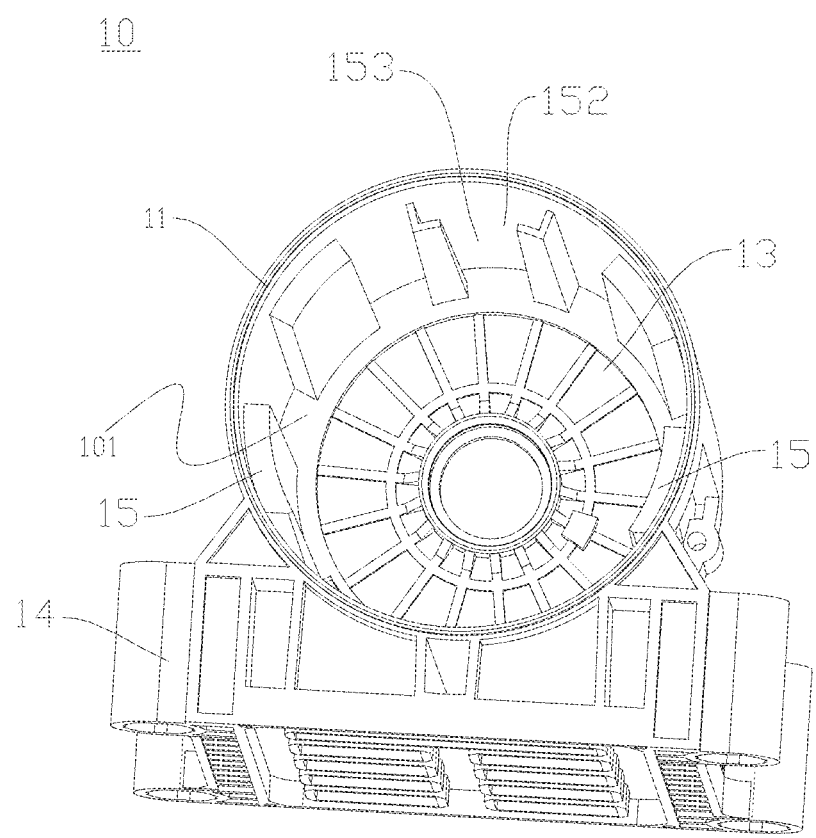
FIG. 11 is a structural schematic view of a valve body provided according to another embodiment of the present disclosure.

In order to make the sealing member 41 be stably limited in the valve cavity 101 of the valve body 10, as shown in FIGS. 7 to 11, in some embodiments, the sealing member 41 further includes limiting parts 414 located at both ends of the sealing body 410 in the circumferential direction of the sealing body 410. The limiting part 414 has a limiting surface 4141, the limiting surface 4141 is joined between an inner surface and an outer surface of the sealing member 41. The valve body 10 further includes a blocking part 15, as shown in FIGS. 9 and 10, the blocking part is a part of the side wall part 11. Alternatively, as shown in FIG. 11, the blocking part 15 may be fixedly connected to the side wall part 11 and arranged in the valve cavity 101. The blocking part 15 has a blocking surface 151, the blocking surface 151 may extend along a radial direction of the side wall part 11 or extend at an angle relative to the radial direction of the side wall part 11. The blocking surface 151 is located in the valve cavity 101, and the limiting surface 4141 is in contact with the blocking surface 151. With the above configuration, the limiting surface 4141 and the blocking surface 151 are in cooperation with each other to prevent the rotation of the sealing member 41 and improve the sealing performance of the sealing member 41.

Since the cross-section of the sealing member 41 is in an arc-shaped structure, the valve core 20 is prone to be in eccentricity when pressing the sealing member 41. Referring to FIG. 9, in some embodiments, the control valve 1 further includes a balance sealing block 42, and the balance sealing block 42 is arranged between the side wall part 11 and the valve core 20. The balance sealing block 42 and the sealing member 41 are respectively arranged on two sides of the valve core 20 in the radial direction of the valve core 20. A surface of the balance sealing block 42 facing the valve core 20 is an arc surface, an axis of the arc surface of the balance sealing block 42 coincides with an axis of the inner surface of the scaling body 410, and a radius of the arc surface of the balance sealing block 42 is equal to a radius of the inner surface of the sealing body 410. In an embodiment, a height of the balance sealing block 42 may be equal to a height of the sealing member 41. Along the height direction of the valve core 20, a height of the sealing member 41 where the sealing member 41 contacts the valve core 10 and a height of the balance sealing block 42 where the balance sealing block 42 contacts the valve core 20 are equal. With the above configuration, the balance sealing block 42 and the sealing member 41 can produce forces on the valve core 20 that are in a same magnitude and in opposite directions, the valve core 20 and the side wall part 11 can be kept to be arranged coaxially, the rotation stability of the valve core 20 can be improved, fluid leakage caused by the eccentricity of the valve core 20 can be prevented, the sealing performance of the control valve 1 can be improved, and the stability of the control valve 1 for fluid control can be improved.

Figure 6:
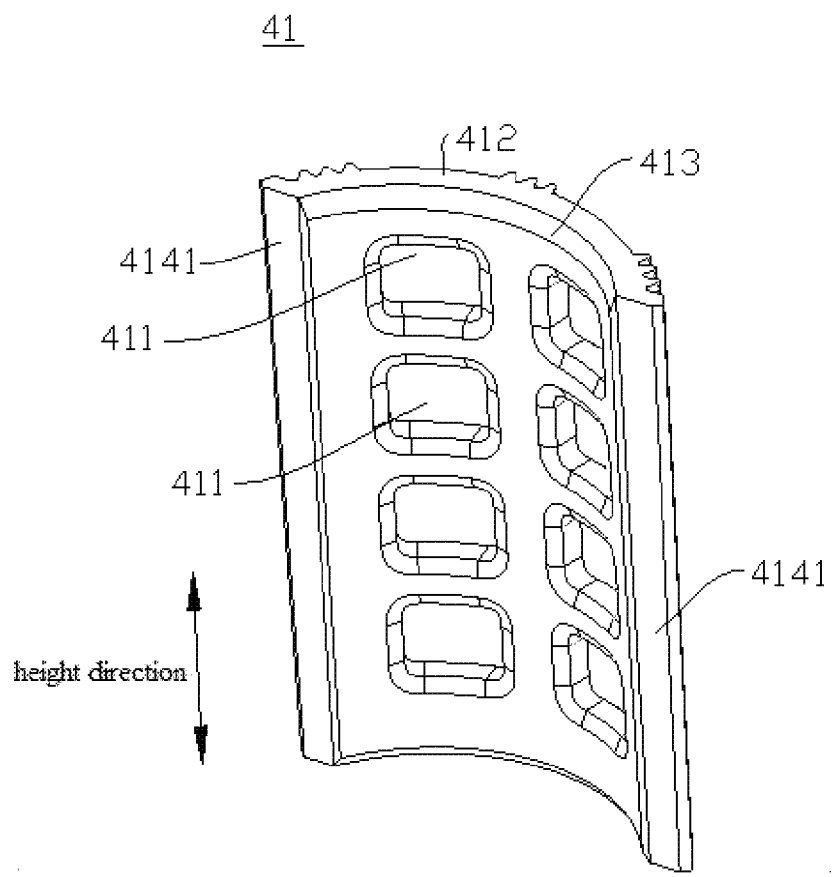
FIG. 6 is a structural schematic view of a sealing member provided according to an embodiment of the present disclosure.

In order to make the valve core 20 rotate stably under a relatively small driving force, as shown in FIGS. 5 to 7, in some embodiments, the sealing member 41 includes a first clastic pad 412 and a first scaling element 413 that are fixedly connected with each other. The first clastic pad 412 is arranged between the first sealing element 413 and the side wall part 11, and the first sealing element 413 is arranged between the first elastic pad 412 and the valve core 20 and is in contact with the valve core 20. The main material of the first scaling element 413 may be Teflon, for example, the first sealing element 413 may be processed and formed of Teflon, the first elastic pad 412 may be processed and formed of rubber, and the first elastic pad 412 and the first sealing element 413 are fixed by bonding to form an integrated structure. In that case, a roughness of a surface of the first sealing element 412 facing the valve core 20 is less than a roughness of a surface of the first clastic pad 412 away from the valve core 20. The main material of the first sealing element 412 is Teflon, so that the first sealing element 412 can perform function not only of sealing, but also of lubrication, which can reduce a friction force between the valve core 20 and the sealing member 41, thereby relatively reducing the driving force of the control valve 1. The first elastic pad 421 includes a main body part and a protrusion part, and the protrusion part is in contact with the side wall part 11. The protrusion part may include a plurality of axial protrusions and a plurality of circumferential protrusions that are intersected with each other. The axial protrusion extends along a height direction of the first clastic pad 421, and the circumferential protrusion extends along a circumferential direction of the first elastic pad 421. By providing the plurality of protrusions, the degree of the compression deformation of the scaling member can be increased, and the sealing performance of the sealing member 41 can be improved.

Figure 12:
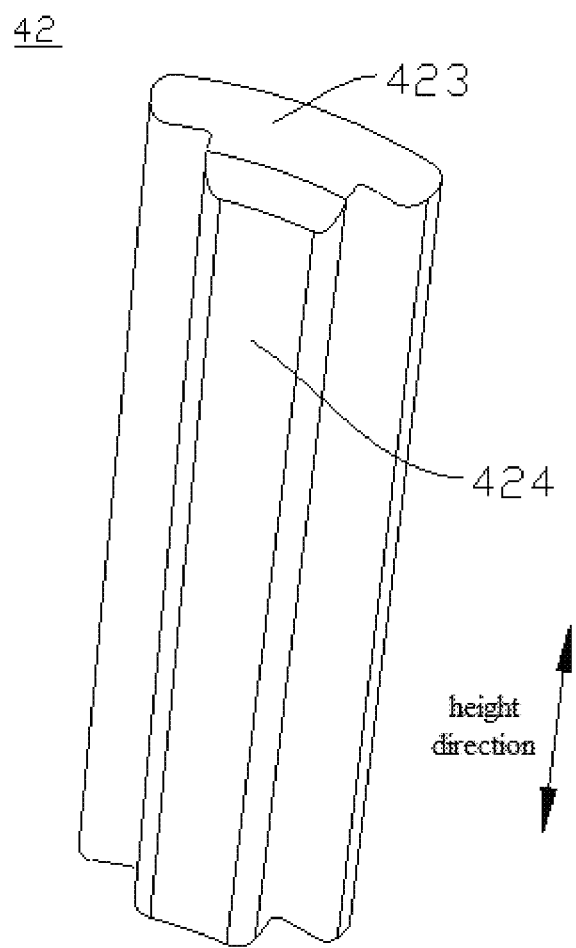
FIG. 12 is a structural schematic view of a balance sealing block provided according to an embodiment of the present disclosure.

Based on this, as shown in FIGS. 9 and 12, the balance scaling block 42 may include a second elastic pad 423 and a second sealing element 424 that are fixedly connected. The second clastic pad 423 is arranged between the second sealing element 424 and the side wall part 11, the second sealing element 424 is arranged between the second elastic pad 423 and the valve core 20 and is in contact with the valve core 20. The main material of the second sealing element 424 may be Teflon, for example, the second sealing element 424 may be processed and formed of Teflon, the second elastic pad 423 may be processed and formed of rubber, and the second elastic pad 423 and the second sealing element 424 are fixed by bonding to form an integrated structure. In that case, a roughness of a surface of the second sealing element 424 facing the valve core 20 is less than that a roughness of a surface of the second elastic pad 423 away from the valve core 20. The main material of the second sealing element 424 is Teflon, so that the second sealing element 424 can perform function not only of sealing, but also of lubrication, which can reduce the friction force between the valve core 20 and the sealing member 41, thereby relatively reducing the driving force of the control valve 1.

In order to make the balance sealing block 42 be stably limited in the valve cavity 101, as shown in FIGS. 9 to 12, in some embodiments, the valve body 10 has an accommodation cavity 152 and an opening 153 along the radial direction of the side wall part 11, and the accommodation cavity 152 is in communication with the valve cavity 101 through the opening 153. An area of a cross section of the accommodation cavity 152 is greater than an area of a cross section of the opening 153. The balance sealing block 42 includes a first portion 421 and a second portion 422 that are fixedly connected to each other, an area of a cross section of the first portion 421 is greater than an area of a cross section of the second portion 422, the first portion 421 is arranged in the accommodation cavity 152, and the second portion 422 is arranged between the valve core 20 and the first portion 421. In that case, the second portion 422 penetrates through the opening 153 to contact the valve core 20. It can be understood that, the cross section is a cross section obtained by cutting the control valve 1 along a direction perpendicular to a height direction of the balance sealing block 42 or along the direction perpendicular to the height direction of the side wall part 11. With the above configuration, the balance scaling block 42 can be limited in the accommodation cavity 152, facilitating the mounting of the balance sealing block 42. In case that the balance sealing block 42 includes a second elastic pad 423 and a second sealing element 424, the first portion 421 may be the second elastic pad 423, the second portion 422 may be the second sealing element 424, or the first portion 421 may be a structure formed by the second elastic pad 423 and a part of the second sealing element 424, and the second portion 422 may be a structure formed by the rest part of the second sealing element 424.

Referring to FIGS. 1 to 3, 9, and 13 to 15, in some embodiments, the communication ports of the side wall part 11 further includes a second communication port 321, and the second communication port 321 is located at an end of the side wall part 11 in the height direction of the side wall part 11 and is provided away from the sealing member 41. The valve core 20 is in a columnar structure, and the valve core 20 includes a top plate 201, a bottom plate 202, an internal communication cavity 21, a plurality of external communication cavities 22, a first partition 23 and a second partition 24. Along the height direction of the valve core 20, the plurality of external communication cavities 22, the first partition 23, and the second partition 24 are located between the top plate 201 and the bottom plate 202, the internal communication cavity 21 is located between the top plate 201 and the bottom plate 202 and penetrates through the bottom plate 202. At least part of the external communication cavities 22 are arranged on an outer peripheral side of the internal communication cavity 21, the first partition 23 is located between the internal communication cavity 21 and the external communication cavity 22, and the second partition 24 is located between two adjacent external communication cavities 22. The first partition 23 has a hole passage 231, and the internal communication cavity 21 is in communication with a part of the external communication cavities 22 through the hole passage 231. The second communication port 321 is in communication with the internal communication cavity 21 through the valve cavity 101, the first communication ports 311 are in communication with the external communication cavities 22 through the through holes 411 of the sealing body 410. Each of the external communication cavities 22 is formed into an independent space by the second partition 24. The valve core 20 is rotated so as to be able to communicate or shut off two valve ports corresponding to the external communication cavity 22 through the external communication cavity 22, and/or, the valve core 20 is rotated so as to be able to communicate or shut off the corresponding two valve ports through the internal communication cavity 21, the hole passage 231, and the external communication cavity 22. One of the two valve ports corresponds to the internal communication cavity 21 and the other of the two valve ports corresponds to the external communication cavity 22. With the above configuration, one control valve 1 can control multiple flow paths, which is more convenient in use and compact in structure.

Figure 13:
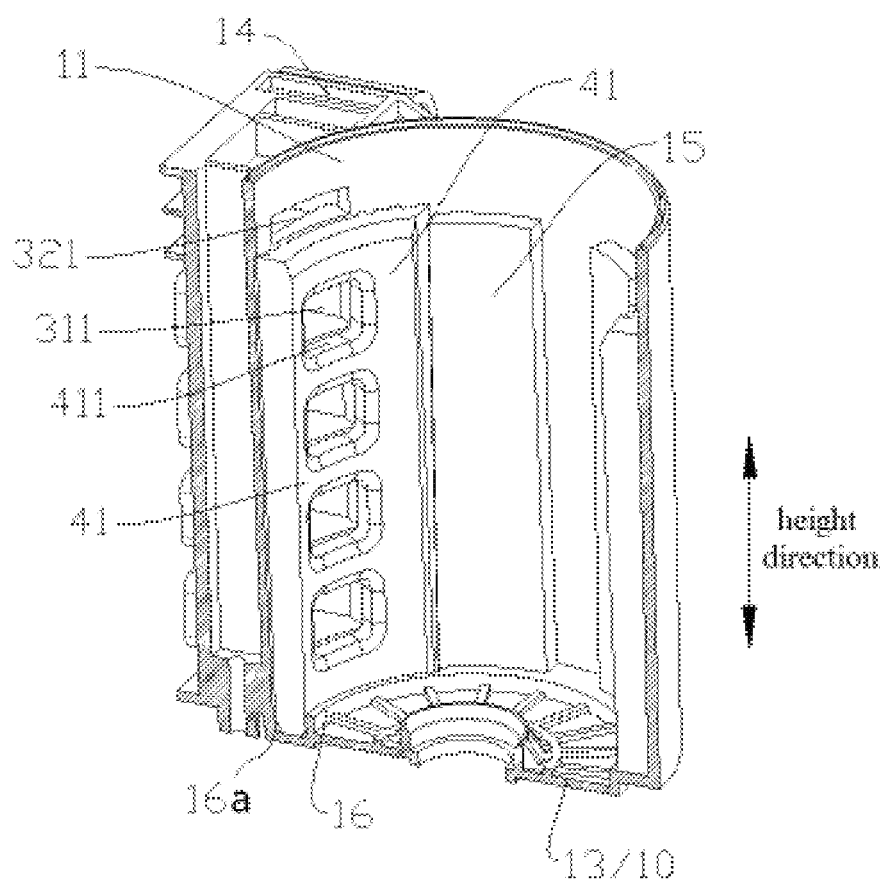
FIG. 13 is a schematic partial cross-section structural view of a combination structure of a valve body and a sealing member provided according to an embodiment of the present disclosure at another position.
Figure 14:
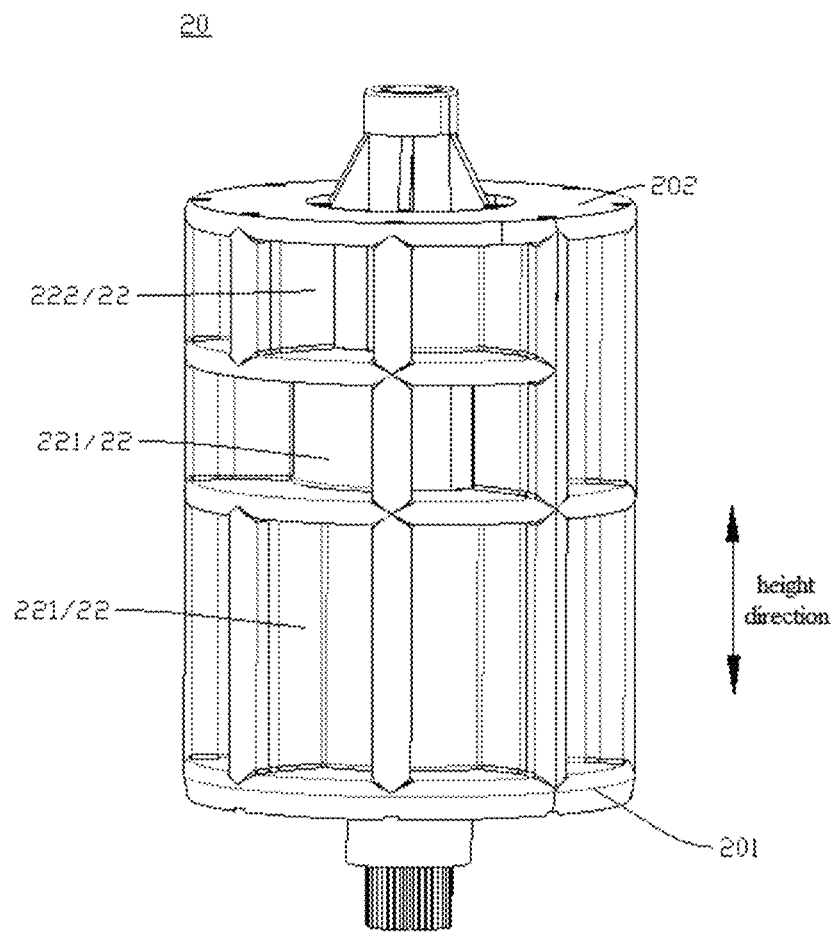
FIG. 14 is a structural schematic view of a valve core provided according to an embodiment of the present disclosure.
Figure 15:
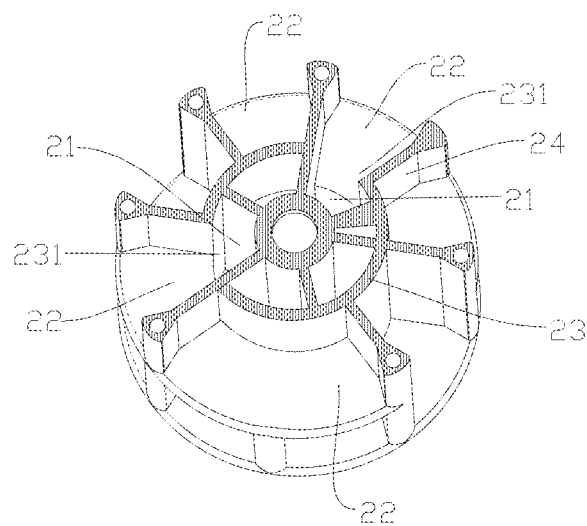
FIG. 15 is a schematic cross-sectional structural view of the valve core in FIG. 14.

As shown in FIG. 13, in order to limit the sealing member 41, in some embodiments, the top wall part 13 and the side wall part 11 of the valve body 10 are formed as an integrated structure by injection molding. In this way, the valve body 10 further includes a protrusion portion 16, and the protrusion portion 16 protrudes from the top wall part 13 and is arranged in the valve cavity. The protrusion portion 16 has a first limit groove 16a, and a groove opening of the first limit groove 16a is in communication with the valve cavity. A part of the inner surface of the side wall part 11 can form a groove wall of the first limit groove 16a, one end of the sealing member 41 in the height direction is arranged in the first limit groove 16a, thereby limiting the assembly position of the sealing member 41. In this way, a width of the first limit groove 16a may be greater than or equal to a thickness of the sealing member 41 in the radial direction of the sealing member 41. In order to increase the strength of the valve body 10, multiple connecting ribs may be provided on the top wall part 13, and the connecting ribs are arranged along the radial direction of the top wall part 13. Alternatively, a group of connecting ribs extending along the circumferential direction of the top wall part 13 may be provided on the top wall part 13, so as to increase the structural strength of the top wall part 13. In an embodiment, in order to limit the position of the balance sealing block 42, the protrusion portion 16 may further include a second limit groove, a groove opening of the second limit groove is in communication with the valve cavity, one end of the balance scaling block 42 in the height direction is arranged in the second limit groove, and a width of the second limit groove may be greater than or equal to a thickness of the balance scaling block 42 in the radial direction.

Further referring to FIGS. 1 to 3, in case that the communication ports further include a second communication port 321 and the valve body includes a mounting part 14, the second communication port 321 is located at one end of the side wall part 11 in the height direction and is located on a side of the side wall part 11 away from the sealing member 41. The mounting part 14 has a mounting surface 141. On the mounting surface 141, the valve ports 102 in communication with the first communication ports 311 and the valve port 102 in communication with the second communication port 321 are rectangular, and cross-sectional areas thereof are the same. With the above configuration, the rate of fluid flow passing through the valve ports 102 can tend to be equal.

The valve ports 102 in communication with the first communication ports 311 are defined as first valve ports 312, and the valve port 102 in communication with the second communication port 321 is defined as a second valve port 322. On the mounting surface 141, a length of the second valve port 322 is greater than twice of a length of the first valve port 312. The mounting part 14 of the valve body 10 may further include a reinforcing rib 142, the reinforcing rib 142 extends along a width direction of the second valve port 322 and is connected between two surfaces of the second valve port 322 oppositely arranged along a height direction of the control valve. With the above configuration, the strength of the control valve 1 at each valve port 102 can be improved, and the quality of the control valve 1 can be improved.

In summary, according to the control valve 1 provided by the embodiments of the present disclosure, the control valve 1 includes the sealing member 41 and the balance sealing block 42. The cross section of the sealing member 41 is in an arc-shaped structure. Compared with an annular structure of a cross section of the sealing member, the sealing member 41 according to the embodiments of the present disclosure has a relatively large expansion space and a relatively low manufacturing precision. The balance sealing block 42 is arranged between the side wall part 11 and the valve core 20, and the balance sealing block 42 and the sealing member 41 are respectively arranged on both sides of the valve core 20 in the radial direction of the valve core 20. The surface of the balance sealing block 42 facing the valve core 20 is an arc surface, the circle center of the arc surface of the balance scaling block 42 coincides with the circle center of the inner surface of the sealing body 410, and the radius of the arc surface of the balance scaling block 42 is equal to the radius of the inner surface of the sealing body 410. When the valve core 20 presses the sealing member and the balance scaling block 42, the balance sealing block 42 and the sealing member 41 can apply force on the valve core 20 that are equal and in opposite directions, so that the valve core 20 and the side wall part 11 can be maintained coaxial, the rotation stability of the valve core 20 can be improved, fluid leakage caused by the eccentricity of the valve core 20 can be prevented, the sealing performance of the control valve 1 can be improved, and the stability of the control valve 1 for fluid control can be improved, so as to facilitate popularization and disclosure.

It should be noted that the above embodiments are only used to illustrate the present disclosure and not to limit the technical solutions described in the present disclosure, For example, definitions for directions such as "front", "back", "left", "right", "up", "down". Although this specification has described the present disclosure in detail with reference to the above embodiments, it should be understood that those skilled in the art can still modify, combine or replace the present disclosure, all technical solutions and improvements thereof that do not deviate from the spirit and the scope of the present disclosure shall fall within the scope of the claims of the present disclosure.

The invention claimed is:

1. A control valve, comprising a valve body, a valve core, and a sealing member, wherein
the valve body comprises a side wall part, the control valve has a valve cavity, the side wall part is a peripheral wall of the valve cavity or at least part of the peripheral wall, and at least part of the valve core and the sealing member are arranged in the valve cavity,
wherein the sealing member comprises a sealing body, the sealing body is arranged between the valve core and the side wall part along a radial direction of the valve core, an inner surface of the sealing body is in contact with the valve core, and an outer surface of the sealing body is in contact with the side wall part; and
the control valve further comprises a balance sealing block, wherein the balance sealing block is arranged between the side wall part and the valve core along the radial direction of the valve core and is in contact with the valve core, the balance sealing block and the sealing member are arranged along a circumferential direction of the valve core, and a direction of a force or a component force applied to the valve core by the balance sealing block on is opposite to a direction of a force or a component force applied to the valve core by the sealing member.

2. The control valve according to claim 1, wherein
the control valve has passages, the side wall part has communication ports, the communication ports are in communication with the valve cavity, one end of each passage penetrates the side wall part to form the communication port, and the other end of each passage forms a valve port of the control valve; and
a cross section of the sealing member along a direction perpendicular to a height direction of the sealing member is in an arc-shaped structure, the sealing body has through holes penetrating through the sealing member, the number of the communication ports in an area of the side wall part where the side wall part is in contact with the sealing body is the same with the number of the through holes and the communication ports are in communication with the through holes correspondingly, the balance sealing block and the sealing member are respectively arranged on both sides of the valve core in the radial direction of the valve core, a surface of the balance sealing block facing the valve core is an arc surface, an axis of the arc surface of the balance sealing block coincides with an axis of the inner surface of the sealing body, a radius of the arc surface of the balance sealing block and a radius of the inner surface of the sealing body are the same, and the valve core is arranged coaxially with the side wall part.

3. The control valve according to claim 2, wherein
two rows of the communication ports are formed in the side wall part in contact with the sealing member along a circumferential direction of the side wall part, and two through holes are formed in the sealing member along a circumferential direction of the sealing member;
on a cross section perpendicular to the height direction of the sealing member, a central angle corresponding to the arc surface of the sealing body is greater than a central angle corresponding to edges of two communication ports of the side wall part arranged along the circumferential direction of the side wall part.

4. The control valve according to claim 2, wherein
the valve body has an accommodation cavity and an opening along a radial direction of the side wall part, the accommodation cavity is in communication with the valve cavity through the opening, and an area of a cross section of the accommodation cavity is greater than an area of a cross section of the opening; and
the balance sealing block protrudes from the opening, and the balance sealing block comprises a first portion and a second portion that are fixedly connected to each other, an area of a cross section of the first portion is greater than an area of a cross section of the opening, the first portion is arranged in the accommodation cavity, and the second portion penetrates through the opening to contact the valve core.

5. The control valve according to claim 2, wherein
a height of the balance sealing block and a height of the sealing member are the same; and
along a height direction of the valve core, a height of the sealing member where the sealing member contacts the valve core between the sealing member and the valve core and a height of the balance sealing block where the balance sealing block contacts the valve core are the same.

6. The control valve according to claim 2, wherein
the sealing member further comprises limiting parts located at both ends of the sealing body in a circumferential direction of the sealing body, each of the limiting parts has a limiting surface, and the limiting surface is joined between an inner surface and an outer surface of the sealing member; and
the valve body further comprises a blocking part, the blocking part is fixedly connected to the side wall part or is a part of the side wall part, the blocking part has blocking surfaces located at both ends of the blocking part in a circumferential direction of the blocking part, the blocking surfaces are arranged in the valve cavity, and the limiting surface is configured to be in contact with the blocking surface.

7. The control valve according to claim 2, wherein
the valve body further comprises a top wall part and a bottom wall part, wherein at least part of the side wall part is located between the top wall part and the bottom wall part, the top wall part and the side wall part are formed as an integrated structure by injection molding, and the bottom wall part is sealingly arranged with the side wall part;
the valve body further comprises a protrusion portion, the protrusion portion protrudes from the top wall part and is arranged in the valve cavity, the protrusion portion has a first limit groove, a groove opening of the first limit groove is in communication with the valve cavity, an end of the sealing member in the height direction of the sealing member is arranged in the first limit groove, and a width of the first limit groove is greater than or equal to a thickness of the sealing member.

8. The control valve according to claim 1, wherein the sealing member comprises a first elastic pad and a first sealing element that are fixedly connected, the first elastic pad is arranged between the first sealing element and the side wall part, the first sealing element is arranged between the first elastic pad and the valve core and contacts the valve core, a roughness of a surface of the first sealing element facing the valve core is less than a roughness of a surface of the first elastic pad away from the valve core.

9. The control valve according to claim 8, wherein the balance sealing block comprises a second elastic pad and a second sealing element that are fixedly connected, the second elastic pad is arranged between the second sealing element and the side wall part, the second sealing element is arranged between the second elastic pad and the valve core and contacts the valve core, a roughness of a surface of the second sealing element facing the valve core is less than a roughness of a surface of the second elastic pad away from the valve core.

10. The control valve according to claim 9, wherein
the first elastic pad is processed and formed of rubber, a main material of the first sealing element is Teflon, and the first elastic pad and the first sealing element are fixed by bonding to form an integrated structure; and
the second elastic pad is processed and formed of rubber, and a main material of the second sealing element is Teflon, and the second elastic pad and the second sealing element are fixed by bonding to form an integrated structure.

11. The control valve according to claim 1, wherein
the valve body has an accommodation cavity and an opening along a radial direction of the side wall part, the accommodation cavity is in communication with the valve cavity through the opening, and an area of a cross section of the accommodation cavity is greater than an area of a cross section of the opening; and
the balance sealing block protrudes from the opening, and the balance sealing block comprises a first portion and a second portion that are fixedly connected to each other, an area of a cross section of the first portion is greater than an area of a cross section of the opening, the first portion is arranged in the accommodation cavity, and the second portion penetrates through the opening to contact the valve core.

12. The control valve according to claim 11, wherein
the balance sealing block comprises a second elastic pad and a second sealing element that are fixedly connected; and
the first portion is the second elastic pad, and the second portion is the second sealing element; or
the first portion is the second elastic pad and a part of the second sealing element, and the second portion is another part of the second sealing element.

13. The control valve according to claim 12, wherein
a height of the balance sealing block and a height of the sealing member are the same; and
along a height direction of the valve core, a height of the sealing member where the sealing member contacts the valve core between the sealing member and the valve core and a height of the balance sealing block where the balance sealing block contacts the valve core are the same.

14. The control valve according to claim 12, wherein
the sealing member further comprises limiting parts located at both ends of the sealing body in a circumferential direction of the sealing body, each of the limiting parts has a limiting surface, and the limiting surface is joined between an inner surface and an outer surface of the sealing member; and
the valve body further comprises a blocking part, the blocking part is fixedly connected to the side wall part or is a part of the side wall part, the blocking part has blocking surfaces located at both ends of the blocking part in a circumferential direction of the blocking part, the blocking surfaces are arranged in the valve cavity, and the limiting surface is configured to be in contact with the blocking surface.

15. The control valve according to claim 12, wherein
the valve body further comprises a top wall part and a bottom wall part, wherein at least part of the side wall part is located between the top wall part and the bottom wall part, the top wall part and the side wall part are formed as an integrated structure by injection molding, and the bottom wall part is sealingly arranged with the side wall part;

the valve body further comprises a protrusion portion, the protrusion portion protrudes from the top wall part and is arranged in the valve cavity, the protrusion portion has a first limit groove, a groove opening of the first limit groove is in communication with the valve cavity, an end of the sealing member in the height direction of the sealing member is arranged in the first limit groove, and a width of the first limit groove is greater than or equal to a thickness of the sealing member.

16. The control valve according to claim 1, wherein
a height of the balance sealing block and a height of the sealing member are the same; and
along a height direction of the valve core, a height of the sealing member where the sealing member contacts the valve core between the sealing member and the valve core and a height of the balance sealing block where the balance sealing block contacts the valve core are the same.

17. The control valve according to claim 1, wherein
the sealing member further comprises limiting parts located at both ends of the sealing body in a circumferential direction of the sealing body, each of the limiting parts has a limiting surface, and the limiting surface is joined between an inner surface and an outer surface of the sealing member; and
the valve body further comprises a blocking part, the blocking part is fixedly connected to the side wall part or is a part of the side wall part, the blocking part has blocking surfaces located at both ends of the blocking part in a circumferential direction of the blocking part, the blocking surfaces are arranged in the valve cavity, and the limiting surface is configured to be in contact with the blocking surface.

18. The control valve according to claim 1, wherein
the valve body further comprises a top wall part and a bottom wall part, wherein at least part of the side wall part is located between the top wall part and the bottom wall part, the top wall part and the side wall part are formed as an integrated structure by injection molding, and the bottom wall part is sealingly arranged with the side wall part;
the valve body further comprises a protrusion portion, the protrusion portion protrudes from the top wall part and is arranged in the valve cavity, the protrusion portion has a first limit groove, a groove opening of the first limit groove is in communication with the valve cavity, an end of the sealing member in the height direction of the sealing member is arranged in the first limit groove, and a width of the first limit groove is greater than or equal to a thickness of the sealing member.

19. The control valve according to claim 18, wherein the protrusion portion has a second limit groove, a groove opening of the second limit groove is in communication with the valve cavity, an end of the balance sealing block in a height direction of the balance sealing block is arranged in the second limit groove, and a width of the second limit groove is greater than or equal to a thickness of the balance sealing block.

* * * * *